May 18, 1954     E. D. WILKERSON     2,678,803
WHEEL SPREADER FOR SIMULATING HIGH SPEED TRAVEL
CONDITIONS INCIDENTAL TO SETTING TOE-IN
Filed Dec. 6, 1950
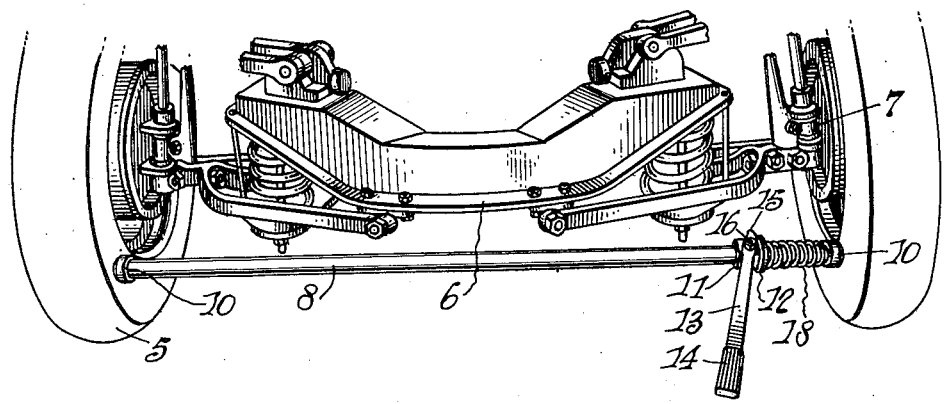
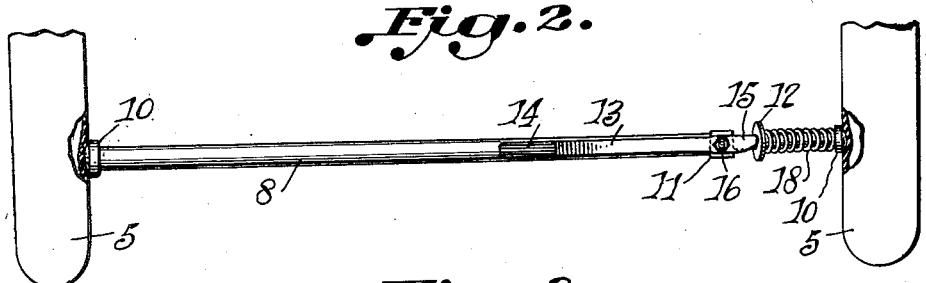
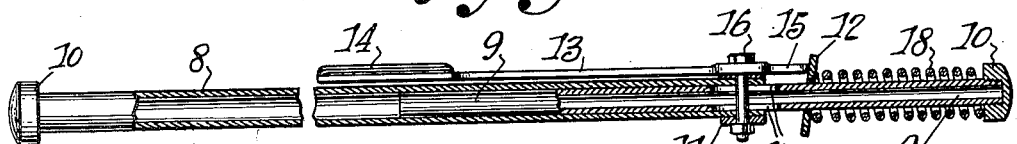
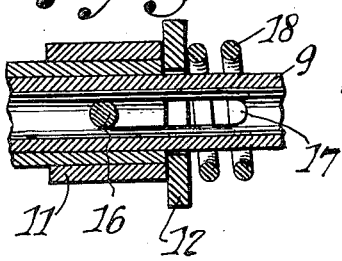
INVENTOR
Edward D. Wilkerson
BY
ATTORNEYS Patented May 18, 1954

2,678,803

UNITED STATES PATENT OFFICE 2,678,803

WHEEL SPREADER FOR SIMULATING HIGH SPEED TRAVEL CONDITIONS INCIDENTAL TO SETTING TOE-IN

Edward D. Wilkerson, Livingston, N. J.

Application December 6, 1950, Serial No. 199,392

9 Claims. (Cl. 254—114)

The invention relates generally to a method and apparatus employed in checking and correcting automobile wheel alignment and primarily seeks to provide a novel method of and a novel wheel spreader for spreading apart the forward halves of the wheels of a front assembly incidental to the checking and correcting of "toe-in," thereby to remove all play or slack in the front assembly during the process and assure that an accurate checking and correction will be effected. This application is a continuation-in-part of the presently pending application for U. S. Letters Patent Serial Number 778,364, now abandoned, filed by me on October 7, 1947.

The term "toe-in" is employed in the automotive industry to describe the setting of the wheels of the front wheel assembly of an automobile closer together on the forward half of the wheels. This setting serves to retard the inner sides of the wheels and advance the outer sides of the wheels in order to offset the camber effect. It is well known that when an automobile is driven at high speed the wheels have a tendency to "spread out" in front due to inward friction. This friction exerts considerable force outward on the front halves of the wheels of the front assembly, and, when the setting is improper, may result in very objectionable and excessive tire wear. The main reason for the "toe-in" setting is to offset or counteract the tendency of the wheels to spread outwardly when the car is driven at high speed as aforesaid, and in fact, if it were possible to test the wheels for "toe-in" while the car was being driven at high speed, it would be found that zero "toe-in" would be present in most cases even though the wheels had been set for a "toe-in" of one-eighth inch in the "stand-still" test. If the car had loose tie-rods, king-pins, wheel bearings, or other parts in the front assembly it probably would have "toe-out" at high speeds. This spread-out action is mainly due to the fact that the wheel and spindle is being pushed forward by the king-pin which is alongside of the wheel on the inside, and the road friction tends to make the wheel buckle out and around the king-pin at high speed, thereby bringing about the "spread-out."

It has been found that the "spread-out" referred to is the most important of any single factor in tire wear. Therefore, every effort should be made to remove all play or slack from the steering connections before attempting to set up the wheel positions. In many cases where the driver of the car is a high speed driver the "toe-in" has to be slightly increased over the specifications in order to assure against objectionable tire wear. Spotty tire wear can be caused by improper "toe-in" due to the fact that the tires would try to roll apart or across each other, and in so doing the rubber stretches on the road surface. Then when the stretch tension overcomes the surface friction, the tire and wheel jumps back into place all at once, so to speak, causing wear at that one spot, and then every time the worn spot comes in contact with the road, it slips again due to the low spot in the tire. This action is repeated and soon a spotty tire wear appears.

Heretofore, the practice of setting "toe-in" or checking "toe-in" has been to test the parallel position of the two front wheels with the car sitting still on the floor. This method has been practiced for years. Through road tests and actual shop practice it has been definitely determined that this common standstill test does not test or set the actual "toe-in." In the past it has been set only by an uncertain approximation. For example, the present day knee-action car has so many connections and moving joints that the combined play in these connections and joints allows the front wheels to assume numerous and variable positions when a car is standing still. This play sometimes amounts to as much as a quarter of an inch or more out at the peripheral portions of the tires. Under such conditions it would be impossible to effect a desired toe-in positioning of one sixteenth of an inch without first, in some manner, definitely eliminating said incidental play. I have determined that it is absolutely essential to spread the front wheels of an assembly in order to eliminate play in the assembly and simulate road travel conditions before checking and setting "toe-in." Unless this is done actual "toe-in" is not being set, because the actual "toe-in" does not appear in a car until the wheel spread, road travel condition is assumed. Therefore, it is a purpose of the present invention to provide a novel method of and means for spreading the wheels of a front assembly to simulate actual road travel conditions and set actual "toe-in."

Various makes of cars have different but definitely known weights and spring characteristics. Tire sizes and inflation pressures also are factors in determining road travel effects in the spreading of the wheels of front assemblies. I have taken into consideration these factors in ascertaining resilient resistance to lateral spreading pressures against the opposing or inner walls of tires of front assemblies of various makes of cars and use the resilient tire walls as bases of known resiliency against which to apply the wheel spreading pressures to be applied on particular makes of cars in order properly to simulate road travel conditions and set the existing "toe-in" before proceeding to test and correct the same. The improved method therefore comprehends the step of applying predetermined spreading pressure to and between the wheels of a front assembly in order to simulate road travel conditions and set existing "toe-in" in said assembly.

It is a purpose of the present invention to provide a novel, simple wheel spreader structure which may be utilized to spread and hold spread apart the forward halves of the wheels during the testing and correction of "toe-in" in the front assembly.

Another object of the invention is to provide a wheel spreader of the character stated comprising the form of a spreader rod or bar composed of telescopically assembled sections having provision at their outer ends for engagement with the yieldable resilient side walls of the wheel tires, and cooperatively engageable cam means for spreading the sections apart so as to press their outer ends tightly against the tire side walls in a manner for spreading the forward halves of the wheels apart.

Another object of the invention is to provide a wheel spreader of the character stated wherein the inner and outer telescoped sections have well rounded heads at their end extremities disposed for engagement with the resilient tire walls, a cock washer surrounding the inner section and being constantly urged toward flat contact with the end of the outer section into which the inner section is telescoped by a compression spring interposed between said washer and the head of the inner section, and the cam means being movable against the washer to cock the same on the inner section and cause it to grip the inner section and move said inner section outwardly with respect to the outer section and thereby extend the wheel spreading length of the wheel spreader.

Another object of the invention is to provide a wheel spreader of the character stated wherein the telescoped sections, the washer and the compression spring are so cooperatively arranged that the spring constantly tends to extend the spreader to a length greater than the spacing of the wheels of all front assemblies on which the spreader may be used, whereby the spreader may be inserted between the wheels of any such assembly and will be self-retaining prior to the actuation of the cam means effective to cock the washer and move it and the gripped inner section endwise in effecting the desired road travel simulating wheel spreading action.

With the above and other objects in view that will hereinafter appear, the nature of the invention will be more clearly understood by reference to the following detailed description, the appended claims, and the several views illustrated in the accompanying drawing.

In the drawing:

Figure 1 is a perspective view illustrating the improved wheel spreader in a partially mounted state between the wheels of a front assembly, the same being in its self-retaining position.

Figure 2 is a plan view showing the wheel spreader fully applied between the wheels of the front assembly, the road travel simulating, fully spread condition being shown.

Figure 3 is a longitudinal sectional view illustrating the wheel spreader, the condition illustrated in Figure 2 being shown.

Figure 4 is an enlarged fragmentary plan view showing the spreader cam released in full lines and partially moved to the wheel spreading position in dotted lines.

Figure 5 is a fragmentary horizontal sectional view taken through the spreader cam mounting, the cock washer and the contacting spring end also being shown.

In the example of embodiment of the invention herein disclosed, a novel wheel spreader structure is shown in Figure 1 as engaged between the wheels 5 of a front wheel assembly of the knee action type generally designated 6 and upon which said wheels are held at the adjusted camber, caster, and "toe-in" relation on the king-pin mountings generally designated 7.

The spreader structure per se is illustrated in detail in Figures 3, 4 and 5 of the drawings, and comprises two telescoped tube sections, the outer tube being designated 8, and the inner tube being designated 9. Each of the tube sections 8 and 9 may be provided with a well rounded tire side wall engaging member or head 10 at its outer end.

On the inner end of the outer tube 8 is affixed a block 11, and said block is opposed by a thrust cock washer 12 which slidably surrounds the inner tube 9 in the manner clearly illustrated in Figures 3, 4 and 5. A lever member 13 having a handle portion 14 at one end and a cam portion 15 at its other end is pivoted adjacent its cam bearing end on a bolt 16 secured to the block 11 and which may pass through an elongated slot 17 in the inner tube 9. It will be obvious that the slot 17 will permit a limited amount of relative telescoping movement of the tube sections 8 and 9.

A compression spring 18 surrounds the inner tube section 9 between the washer 12 and the adjacent tube head 10 and constantly tends to move the tube section 9 out of the tube section 8, or in other words to extend the length of the spreader within the limit permitted by the bolt and slot connections 16 and 17. It is to be understood, of course, that the length of the tube sections 8, 9 and the arrangement of the bolt and slot arrangement 16 and 17 are so selected as to adapt the spreader for self-retention mounting between the wheels of all front assemblies on which the spreader may be brought into use.

It is common knowledge in the automotive industry that the automobile factories set the "toe-in" in front assemblies while all of the various joints are tight. In new cars, the wheels cannot "spread out" to any great extent while driving since there is at this time very little play in the front assembly. However, after the car has been driven several thousand miles a slight amount of wear occurs in each of the several joints or connections. There are (on the average) twenty-two moving connections or joints and twenty-four bolted connections or joints that control "toe-in" between the two front wheels. Assuming that the twenty-four bolts are tight and that there exists .002" play in each moving joint this would allow an aggregate .044" of play. The leverage ratio of the connections multiply four times out to the tire surface. Thus there would be .044×4 or a .176" of play in the "toe-in" controls on a car having no more than .002" play in any one connection or joint. This aggregate play amounts to almost $\tfrac{3}{16}$ of an inch, and yet it would not be proper to say that this assembly is in fact "loose." It will be obvious, however, that in testing such a car, if no provision were made for holding the forward portions of the wheels spread apart during the "toe-in" test and correction, there would be no way of knowing whether the play was "in" or "out," or in other words where the wheels would be in actual high speed driving along the road. The cumulated wear will become greater as the car becomes older, and this cumulated wear may in some instances amount to as much as one inch.

By employment of the herein disclosed wheel spreader in the manner illustrated in Figures 1 and 2, it is possible to so spread the wheels as to take up the play or slack in the steering connections in a manner for assuring an accurate "toe-in" test and correction. When the wheel bearings are properly adjusted and the mechanic is ready to test "toe-in," the spreader is applied in the manner illustrated in Figure 1 of the drawing, the spring action serving automatically to retain the spreader in position between and in contact with the yieldable, resilient side walls of the tires. By now turning the handle 14 to the left, as shown in Figure 4, the cam portion 15 will be brought into engagement with the washer 12 to force it away from its flatwise engagement with the block 11 and cause it to cock and grip the tube section 9 as shown in said Figure 4 in dotted lines. See also Figure 3. Action of the cam portion 15 will now cause the washer and tube section 9 to move together, or in other words force the tube sections apart so as to lengthen the spreader or increase the spacing of the well rounded end heads 10 thereof. This brings about the desired spreading of the wheels and simulates a high speed road travel condition and it also ascertains and fixes the "toe-in" condition then existing in the front wheel assembly, assuming that such a condition actually exists. It is now possible to proceed accurately with the proper adjustments of the "toe-in" condition to meet standard requirements.

It has been stated hereinabove that it is a purpose of the invention to provide a novel method of spreading the wheels of a front assembly to simulate high speed road travel conditions incidental to the setting of "toe-in." Whether this spreading of the wheels is accomplished by applying outwardly directed pressure to and between the front halves of the wheels of the assembly, or inwardly directed pressure to the rear halves of said wheels is immaterial. Both procedures are comprehended in the herein disclosed and claimed method invention.

It will be apparent from the foregoing that the invention herein disclosed takes advantage of the fact that the tire inflation pressure carried by an individual car, and which varies with the particular car, is a true representation of the car weight, the car springs and the general mechanism of the car front end. As before stated, the variation in tire size and inflation pressure does represent a supporting tension for each individual car, and I have found that I can use the sides of the tires as a resilient base, and that the resiliency of said base, known in cars of individual make and based upon the inherent tire wall resiliency and the inflation pressure in the tire, will correspond to the also known weight and spring construction of the said individual make of car being tested. Just as the amount of pressure in a tire necessary to support the car is a fair representation of the weight of the car, so it is also a fair representation as to the amount of spread-out pressure that high speed travel will cause in the car. The herein disclosed invention has been designed to take advantage of these factors in accurately setting and correcting "toe-in."

The herein disclosed spreader selects the wheel tread width automatically and is self-retaining between the wheels before the actual camming action of mechanical spreading is initiated. This is because the spring 18 always exerts its pressure tending to lengthen the spreader or force the sections 8 and 9 apart, even though the lever 13, 14 and 15 is in neutral position. The spring also holds the washer 12 flat against the block 11 so that the spreader sections will telescope freely either in or out when said lever is in neutral as shown in Figures 1 and 4. The spring also forces the washer and the head 10 of the section 9 apart so as to always deliver a predetermined travel when the lever is operated, regardless of the distance the tires might move apart, when said handle is operated to cock the washer 12 and effect a movement of the section 9 relative to the section 8 two or three times. In some cases in which a great amount of play is present in a front assembly it may be necessary to operate the lever two or three times to move the wheels apart into existing "toe-in" setting, thereby to enable the operator to make a proper and accurate correction of the "toe-in."

While one form of the invention has been shown for purposes of illustration, it is to be clearly understood that various changes in the details of construction and arrangement of parts may be made without departing from the spirit and scope of the invention as defined in the appended claims.

I claim:

1. A spreader adapted for spreading and holding apart the forward half portions of the rubber tired wheels of a vehicle front assembly in order to take up slack or lost motion in said assembly prior to and during the testing and correcting of "toe-in," said spreader comprising telescopically assembled rod sections having at their outer ends contact pieces well rounded and of predetermined definite small area adapted for non-damaging engagement between and against the yieldable and resilient walls of the wheel tires of a vehicle front assembly which is to be tested and bearing a predetermined definite relation to the known resiliency of said tire walls, and means for positively moving one rod section endwise with relation to the other a predetermined definite distance so as to make it possible to increase the length of the assembled sections a predetermined definite amount while it is in place between the wheels of a front end assembly so as to take up all slack or lost motion in the front assembly and secure said extended length with the rod end contact pieces tightly and yieldingly engaging against and indented in the tire walls of said assembly.

2. A spreader adapted for spreading and holding apart the forward half portions of the rubber tired wheels of a vehicle front assembly in order to take up slack or lost motion in said assembly prior to and during the testing and correcting of "toe-in," said spreader comprising telescopically assembled rod sections having at their outer ends contact pieces well rounded and of predetermined definite small area adapted for non-damaging engagement between and against the yieldable and resilient walls of the wheel tires of a vehicle front assembly which is to be tested and bearing a predetermined definite relation to the known resiliency of said tire walls, and means for positively moving one rod section endwise with relation to the other a predetermined definite distance so as to make it possible to increase the length of the assembled sections a predetermined definite amount while it is in place between the wheels of a front end assembly so as to take up all slack or lost motion in the front assembly and secure said extended length with the rod end contact pieces tightly and yieldingly engaging against and indented in the tire walls of said assembly, said last named means comprising a cam plate secured to one section, and a lever swingably mounted on the other section and having a cam portion engageable with said plate upon swinging of the lever to bring about relative movement of separation of the outer ends of said sections and placeable in dead center relation to the rod sections so as to secure the extended length of the rod, said lever and cam portion being longitudinally aligned so as to compactly overlie the rods in an out-of-the-way position when said rod sections are being held in extended relation.

3. A spreader adapted for spreading and holding apart the forward half portions of the rubber tired wheels of a vehicle front assembly in order to take up slack or lost motion in said assembly prior to and during the testing and correcting of "toe-in," said spreader comprising telescopically assembled rod sections having at their outer ends contact pieces well rounded and of predetermined definite small area adapted for non-damaging engagement between and against the yieldable and resilient walls of the wheel tires of a vehicle front assembly which is to be tested and bearing a predetermined definite relation to the known resiliency of said tire walls, and means for positively moving one rod section endwise with relation to the other a predetermined definite distance so as to make it possible to increase the length of the assembled sections a predetermined definite amount while it is in place between the wheels of a front end assembly so as to take up all slack or lost motion in the front assembly and secure said extended length with the rod end contact pieces tightly and yieldingly engaging against and indented in the tire walls of said assembly, said last named means comprising a cam plate secured to one section, and a lever pivoted on the other section having a straight line handle portion extending to one side of the pivot and a straight line cam portion extending in line with the handle portion and to the other side of the pivot in longitudinal alignment with said handle portion and in position for engaging with said cam plate upon swinging of the handle portion in line with and compactly over the rod sections to bring about relative movement of separation of the outer end of said sections.

4. A spreader adapted for spreading and holding apart the forward half portions of the rubber tired wheels of a vehicle front assembly in order to take up slack or lost motion in said assembly prior to and during the testing and correcting of "toe-in," said spreader comprising telescopically assembled inner and outer rod sections having at their outer ends contact heads well rounded and of predetermined definite small area adapted for non-damaging engagement between and against the yieldable and resilient walls of the wheel tires of the front assembly, a cock washer surrounding the inner tube in position for engaging the open end of the outer section into which the inner section is telescoped, a compression spring coiled about the inner section and engaging at its ends with said washer and the inner section so as to constantly tend to extend the sections and the length of the spreader and to hold the washer in uncocked position in the inner section, and means on the outer section and engageable with the washer to cock it on the inner section and cause the washer to lock on the inner section and the washer and inner section to move endwise in unison to increase the length of the spreader and effect a spreading apart of the wheels.

5. A spreader as defined in claim 4 in which there is included means for limiting the amount of relative movement of separation of the spreader sections, the length of the spreader at said limit being greater than the spacing of the tire walls of the wheels of any front assembly on which the spreader is to be used.

6. A spreader as defined in claim 4 in which there is included slot and cross pin means connecting the spreader sections against separation and effective for limiting the amount of relative movement of separation of the spreader sections, the length of the spreader at said limit being greater than the spacing of the tire walls of the wheels of any front assembly on which the spreader is to be used.

7. A spreader as defined in claim 4 in which the washer cocking means comprises a lever swingably mounted on the outer section on a pivot pin disposed with its axis intersecting the axis of the sections and having a cam portion engageable with the washer.

8. A spreader as defined in claim 4 in which the washer cocking means comprises a lever swingably mounted on the outer section on a pivot pin disposed with its axis intersecting the axis of the sections and having a cam portion engageable with the washer, said lever and cam portion extending in longitudinal alignment at opposite sides of the lever pivot so that the lever can be swung into line over the center of the telescoped spreader sections with the cam portion imparting the maximum movement to the cocked washer and the inner section on which it is locked due to such cocking.

9. A spreader as defined in claim 4 in which a cross pin passes through the outer section and through an elongated slot in the inner telescoped section and comprises means for limiting the amount of relative movement of separation of the spreader sections, the length of the spreader at said limit being greater than the spacing of the tire walls of the wheels of any front assembly on which the spreader is to be used, and wherein the washer cocking means comprises a lever swingably mounted on said pin and having a cam portion engageable with the washer.

References Cited in the file of this patent
UNITED STATES PATENTS

| Number | Name | Date |
| --- | --- | --- |
| 1,499,755 | Stelbins | July 1, 1924 |
| 1,922,748 | Roemer | Aug. 15, 1933 |
| 1,935,377 | Roemer | Nov. 14, 1933 |
| 2,222,910 | Tucker | Nov. 26, 1940 |
| 2,509,466 | Leach | May 30, 1950 |
| 2,552,178 | James | May 8, 1951 |